Patented May 25, 1954

2,679,523

UNITED STATES PATENT OFFICE 2,679,523

ESTERS OF OXYPROPYLATED CYCLO-HEXANE GLYCOLS AND POLYCAR-BOXYLIC ACIDS

Melvin De Groote, University City, Mo., assignor to Petrolite Corporation, a corporation of Delaware No Drawing. Application January 21, 1952,
Serial No. 267,516

11 Claims. (Cl. 260—475)

The present invention is concerned with certain new chemical products, compounds, or compositions which have useful application in various arts. It includes methods or procedures for manufacturing said new chemical products, compounds or compositions, as well as the products, compounds, or compositions themselves.

The present invention is concerned with fractional esters obtained from polycarboxy acids, or the equivalent, and oxypropylated glycols, in which the parent glycol has either one of two general formulas:

(A)

HOCH$_2$(CH$_2$CH)$_n$OH

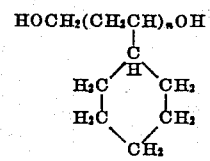

where $n$ is an integer from 2 to 5; or
(B) 3,5-dialkylcyclohexyl glycol, such as

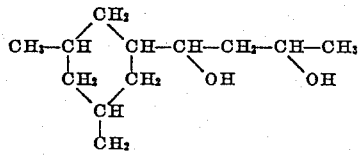

Such glycol of the kind described is treated with propylene oxide so that the molecular weight based on the hydroxyl value is in the range of 1000 to approximately 5000 to 7000. oxypropylated derivatives are invariable xylene-soluble and water-soluble. When the molecular weight, based on the hydroxyl value, is in the neighborhood of 1000 or thereabouts, the oxypropylated product is invariably kerosene-soluble. In fact, depending on the particular glycol subjected to oxypropylation the product may become kerosene-soluble at a lower range, for instance, at a range as low as 700 or 800 molecular weight, or even lower.

These glycols which are subjected to oxypropylation prior to esterification can be obtained by well known methods, for example, in the manner described in U. S. Patent No. 2,555,912, dated June 5, 1951, to Arnold.

For convenience, the oxypropylated derivatives of the first class of glycols, may be indicated thus:

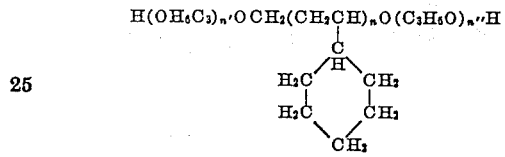

in which $n$ has its prior significance and $n'$ and $n''$ represent whole numbers which, when added together, equal a sum varying from 15 to 80, and the acidic ester obtained by reaction of the polycarboxy acid may be indicated thus:

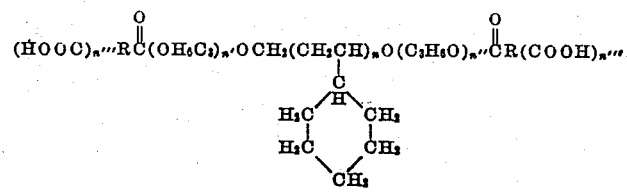

in which the characters have their previous significance, $n'''$ is a whole number not over 2, and R is the radical of the polycarboxy acid

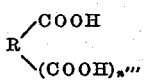

Essentially, the principal difference between the two classes of glycols employed as initial reactants is largely the fact that in one instance the cyclohexyl or substituted cyclohexyl group, or groups, appears as a substituent between the two hydroxyl radicals, whereas in the other instance it is adjacent to the two hydroxyl radicals, and such two hydroxyl radicals are not separated by the large hydrophobe group. As far as the procedure itself goes, either type of glycol may be used to illustrate both classes. As to dialkylcyclohexyl glycols consisting of the second class, see U. S. Patent No. 2,449,956 dated September 21, 1948, to Shokal and Morris. Purely as a matter of convenience then the bulk of the discussion will be liimted to the first class but examples will illustrate the use of both classes.

Using alkylcyclohexyl glycols and more specifically dialkylcyclohexyl glycols as herein specified as illustrated in the second class, it becomes obvious the second class can be illustrated by the following formula:

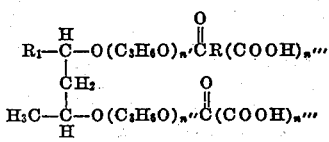

in which $n'$, $n''$, and $n'''$ have the same value as previously and the radical $R_1$ is a dialkylcyclohexyl radical attached to the one carbon of 1,3-butanediol.

As far as I am aware the diols of the kind here described, and illustrated by the general formulas:

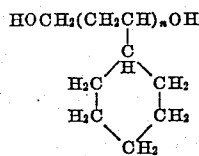

or

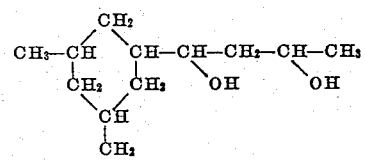

may have been subjected to oxyethylation to produce a surface-active material but, if so, I am not aware of the fact. As is well known numerous water-insoluble compounds susceptible to oxyalkylation, and particularly to oxyethylation, have been oxyethylated so as to produce effective surface-active agents, which, in some instances at least, also have had at least modest demulsifying property. Reference is made to similar monomeric compounds having a hydrophobe group containing, for example, 8 to 32 carbon atoms and a reactive hydrogen atom, such as the usual acids, alcohols, alkylated phenols, amines, amides, etc. In such instances, invariably the approach was to introduce a counterbalancing effect by means of the addition of a hydrophile group, particularly ethylene oxide, or, in some instances, glycide, or perhaps a mixture of both hydrophile groups and hydrophobe groups, as, for example, in the introduction of propylene oxide along with ethylene oxide. On another type of material a polymeric material, such as resin, has been subjected to reaction with an alkylene oxide including propylene oxide. In such instances certain derivatives obtained from polycarboxy acids have been employed.

Obviously, thousands and thousands of combinations, starting with hundreds of initial water-insoluble materials, are possible. Exploration of a large number of raw materials has yielded only a few which appear to be commercially practical and competitive with available demulsifying agents.

Exhaustive oxypropylation renders a water-soluble material water-insoluble. Similarly, it renders a kerosene-insoluble material kerosene-soluble; for instance, reference has been made to the fact that this is true, for example, using polypropyleneglycol 2,000. Actually, it is true with polypropyleneglycol having lower molecular weights than 2,000. These materials are obtained by the oxypropylation of a water-soluble kerosene-insoluble material, i. e., either water or propyleneglycol.

Just why certain different materials which are water-insoluble to start with, and which presumably are rendered more water-insoluble by exhaustive oxypropylation (if such expression as "more water-insoluble" has significance) can be converted into a valuable surface-active agent, and particularly a valuable demulsifying agent, by reaction with a polycarboxy acid which does not particularly affect the solubility one way or the other—depending upon the selection of the acid—is unexplainable.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in my co-pending application, Serial No. 267,513, filed January 21, 1952.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

For convenience, what is said hereinafter will be divided into four parts:

Part 1 will be concerned with the oxypropylated derivatives, i. e., diols of the previously described glycols;

Part 2 will be concerned with the preparation of esters from the aforementioned diols or dihydroxylated compounds;

Part 3 will be concerned with the nature of the products obtained by oxypropylation in light of the fact that certain side reactions invariably and inevitably occur; and Part 4 will be concerned with certain derivatives which can be obtained from these acidic esters and which, in turn, are valuable for a variety of purposes.

PART 1

Oxypropylation, like other oxyalkylation operations, should be carried out with due care, in equipment specially designed for the purpose and with precautions that are now reasonably well understood. Reference is made to the discussion of the factors involved in oxypropylation which appears in Patent 2,626,918, column 5 through column 8, the considerations and the technique there discussed being equally applicable to the production of the compounds of the present application. In view of this reference to Patent 2,626,918, no general discussion of the factors involved in oxypropylation is given here, and the procedure will simply be illustrated by the following examples:

Example 1a

The starting material was 1-cyclohexyl-1,3-propanediol. The particular autoclave employed was one having a capacity of about 15 gallons, or on the average of 125 pounds of reaction mass. The speed of the stirrer could be varied from about 150 to 350 R. P. M. 8.5 pounds of 1-cyclohexyl-1,3-propanediol were charged into the autoclave, along with 1½ pounds of finely powdered caustic soda. No solvent was added in this particular run, although on smaller runs small amounts of xylene have been added, for instance, about one-half as much xylene as substituted glycol. Needless to say, one could add not only xylene but, for that matter, any conventional solvent. Even if the glycol is not completely soluble in the selected solvent it still produces a slurry that is sometimes more convenient to handle.

The reaction pot was flushed out with nitrogen, the autoclave was sealed, and the automatic devices set for injecting 86 pounds of propylene oxide in about 4 hours. At the end of this time the stirring was continued for another one-half hour. The pressuring devices were set for a maximum of 30 pounds per square inch, or slightly in excess thereof, for instance, about 32 or even 33 pounds. Actually, in the course of the reactions due to the presence of a generous amount of catalyst the reaction pressure never got over 15 to 20 pounds, either at this particular stage or in any of the subsequent examples, Nos. 2a through 4a, inclusive. For this reason no further reference will be made to operating pressures at subsequent stages. Needless to say, when one sets the gauge for a maximum pressure, the bulk of the reaction can take place and probably does take place at a lower pressure. The lower pressure is the result, as a rule, of (a) activity of the reactant, (b) presence of a sizable amount of catalyst, (c) efficient agitation, and (d) a fairly long time of reaction. The propylene oxide was added comparatively slowly, and, more important, the selected temperature, although moderately higher than the boiling point of water was not excessively high; for instance, in this particular stage, and in fact in all subsequent stages, reaction took place within the range of 130° to 150° C. For this reason no further reference will be made in Examples 2a through 4a to temperature of reaction.

At the completion of the reaction a sample was taken and oxypropylation proceeded as in Example 2a, following:

Example 2a 60 pounds of the reaction mass, identified as Example 1a, preceding, and equivalent to 5.34 pounds of the original glycol, 54.03 pounds of propylene oxide, and .63 pound of caustic soda, were permitted to remain in the reaction vessel without the addition of any solvent and without the addition of any more catalyst. 30 pounds of propylene oxide were added. The oxypropylation was conducted in the same manner as outlined in Example 1a, preceding, particularly with regard to temperature and pressure. The reaction time was slightly shorter, notwithstanding a lower concentration of the catalyst. The explanation might be, since the reaction vessel contained more reaction mass, that agitation was better at any selected speed. Another item, of course, might be the fact that the amount of oxide added was considerably less. The time required was 3 hours.

At the end of the reaction period part of the reaction mass was withdrawn as a sample and oxypropylation continued with the remainder of the reaction mass as described in Example 3a, following.

Example 3a 65 pounds of the reaction mass identified as Example 2a, preceding, and equivalent to 3.86 pounds of the original glycol, 60.7 pounds of propylene oxide, and .44 pound of caustic soda, were permitted to stay in the autoclave. 30 pounds of propylene oxide were added in the third stage. Reaction time was 4 hours. The conditions as far as temperature and pressure were concerned were the same as in the previous two examples.

After completion of the reaction, part of the reaction mass was withdrawn and the remainder subjected to further oxypropylation in the manner described in Example 4a, following.

Example 4a 55 pounds of the reaction mass identified as Example 3a, preceding, and equivalent to 2.23 pounds of the original glycol, 52.52 pounds of propylene oxide, and .25 pound of caustic soda, were permitted to remain in the reaction vessel. Without adding any more catalyst this reaction mass was subjected to further oxypropylation in the same manner as in the three preceding examples. 30 pounds of propylene oxide were added in a 4½ hour period. Conditions as far as temperature and pressure were concerned were the same as in the preceding examples.

At the completion of the reaction period the mass was stirred for about 45 minutes longer just to be certain that complete reaction had taken place.

In this particular series of experiments oxypropylation was stable at this stage. In other series I have continued oxypropylation so the theoretical molecular weight, instead of being approximately 6,000, was about 10,000, and the hydroxyl molecular weight, instead of being somewhat short of 3,000 was approximately 3,800. Other weights, of course, are obtainable, using the same procedure.

What is said herein is presented in tabular form in Table 1, immediately following, with some added information as to molecular weight and as to solubility of the reaction product in water, xylene and kerosene.

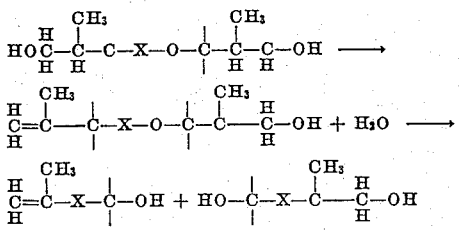

In the above formulas the large X obviously is not intended to signify anything except the central part of a large molecule, whereas, as far as a speculative explanation is concerned, one need only consider the terminal radicals as shown. Such suggestion is of interest only because it may be a possible explanation of how an increase in hydroxyl value does take place which could be interpreted as a decrease in molecular weight.

TABLE 1

| Ex. No. | Composition Before | | | Theo. M. W. | High Molal Glycol, lbs. | Oxide Amt., lbs. | Catalyst, lbs. | Hyd. Mol. Wt. | Max. Temp., °C. | Max. Pres., lbs. sq. in. | Time, Hrs. |
|---|---|---|---|---|---|---|---|---|---|---|---|
| | High Molal Glycol, lbs. | Oxide Amt., lbs. | Catalyst, lbs. | | | | | | | | |
| 1a | 8.5 | -------- | 1.0 | 1,758 | 8.5 | 86.0 | 1.0 | 1,350 | 130-135 | 15-20 | 4 |
| 2a | 5.34 | 54.03 | .63 | 2,640 | 5.34 | 84.0 | 0.63 | 1,786 | 130-135 | 15-20 | 3 |
| 3a | 3.86 | 60.7 | .44 | 3,878 | 3.86 | 90.7 | 0.44 | 2,130 | 130-135 | 15-20 | 4 |
| 4a | 2.23 | 52.52 | .25 | 5,995 | 2.23 | 82.5 | 0.25 | 2,860 | 130-135 | 15-20 | 4½ |
| 5a | 16.0 | -------- | 1.5 | 1,708 | 16.0 | 86.0 | 1.5 | 1,420 | 130-135 | 15-20 | 3 |
| 6a | 9.27 | 49.86 | .87 | 2,578 | 9.27 | 80.0 | .87 | 1,870 | 130-135 | 15-20 | 2 |
| 7a | 6.16 | 53.26 | .58 | 3,870 | 6.16 | 83.0 | .58 | 2,140 | 130-135 | 15-20 | 2 |
| 8a | 3.82 | 51.57 | .36 | 5,998 | 3.82 | 81.57 | .36 | 2,750 | 130-135 | 15-20 | 3½ |
| 9a | 11.5 | -------- | 1.5 | 1,700 | 11.5 | 86.0 | 1.5 | 1,240 | 130-135 | 15-20 | 5 |
| 10a | 6.8 | 52.3 | .90 | 2,620 | 6.8 | 82.3 | .90 | 1,630 | 130-135 | 15-20 | 3 |
| 11a | 4.53 | 54.8 | .67 | 3,940 | 4.53 | 84.8 | .67 | 1,910 | 130-135 | 15-20 | 4½ |
| 12a | 3.02 | 56.53 | .45 | 5,270 | 3.02 | 76.53 | .45 | 2,200 | 130-135 | 15-20 | 5½ |

Examples 1a through 4a were prepared from 1-cyclohexyl-1,3-propanediol.
Examples 5a through 8a were prepared from 1,3-dicyclohexyl-1,5-pentanediol.
Examples 9a through 12a were prepared from 1-(3,5-dimethylcyclohexyl)-1,3-butanediol.

As far as solubility is concerned, all the products were water-insoluble at all stages, but were xylene-soluble; and in the higher stages of oxypropylation, for instance at a hydroxyl molecular weight of 2,000 or more, they were kerosene-soluble.

Ordinarily in the initial oxypropylation of a simple compound, such as ethylene glycol or propylene glycol, the hydroxyl molecular weight is apt to approximate the theoretical molecular weight, based on completeness of reaction, if oxypropylation is conducted slowly and at a comparatively low temperature, as described. In this instance, however, this does not seem to follow, as it is noted in the preceding table that at the point where the theoretical molecular weight is approximately 2,000, the hydroxyl molecular weight is only about one-half this amount. This generalization does not necessarily apply where there are more hydroxyls present, and in the present instance the results are somewhat peculiar when compared with simple dihydroxylated materials as described, or with phenols.

The fact that such pronounced variation takes place between hydroxyl molecular weight and theoretical molecular weight, based on completeness of reaction, has been subjected to examination and speculation, but no satisfactory rationale has been suggested.

One suggestion has been that one hydroxyl is lost by dehydration and that this ultimately causes a break in the molecule in such a way that two new hydroxyls are formed. This is considered subsequently in Part 3. Formation of cyclic alkylene oxide polymers, if not reactive toward polycarboxy acids, presumably would have the effect of decreasing the apparent hydroxyl value.

The final products at the end of the oxypropylation step were somewhat viscous liquids, about as viscous as ordinary polypropylene glycols, with a dark amber tint. This color, of course, could be removed if desired by means of bleaching clays, filtering chars, or the like. The products were slightly alkaline due to the residual caustic soda. The residual basicity due to the catalyst would be the same if sodium methylate had been employed.

Needless to say, there is no complete conversion of propylene oxide into the desired hydroxylated compounds. This is indicated by the fact that the theoretical molecular weight, based on a statistical average, is greater than the molecular weight calculated by usual methods on basis of acetyl or hydroxyl value. This is true even in the case of a normal run of the kind noted previously. It is true also in regard to the oxypropylation of simple compounds, for instance, propylene glycol or ethylene glycol.

Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters, as described in Part 2, the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out, the present invention is concerned with acidic esters obtained from the oxypropylated derivatives described in Part 1, preceding, and polycarboxy acids, particularly tricarboxy acids like citric, and dicarboxy acids such as adipic acid, phthalic acid, or anhydride, succinic acid, diglycollic acid, sebacic acid, azelaic acid, aconitic acid, maleic acid, or anhydride, citraconic acid or anhydride, maleic acid or anhydride adducts, as obtained by the Diels-Alder reaction from products such as maleic anhydride, and cyclopentadiene. Such acids should be heat-stable so they are not decomposed during esterification. They may contain as many as 36 carbon atoms, as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols, or other hydroxylated compounds, is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is used as a catalyst. Such device or absorption spreader consists of minute alundum thimbles which are connected to a gas tube. One can add a sulfonic acid such as paratoluene sulfonic acid as a catalyst. There is some objection to this because in some instances there is some evidence that this acid catalyst tends to decompose or rearrange heat-oxypropylated compounds. It is particularly likely to do so if the esterification temperature is too high. In the case of polycarboxy acids such as diglycollic acid which is strongly acidic there is no need to add any catalyst. The use of hydrochloric acid gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol, as described in the final procedure just preceding Table 2.

The products obtained in Part 1, preceding, may contain a basic catalyst. As a general procedure, I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required. In any event, the neutral or slightly acidic solution of the oxypropylated derivatives described in Part 1 is then diluted further with sufficient xylene, decalin, petroleum solvent, or the like, so that one has obtained approximately a 45%–65% solution. To this solution there is added a polycarboxylated reactant, as previously described, such as phthalic anhydride, succinic acid, or anhydride, diglycollic acid, etc. The mixture is refluxed until esterification is complete, as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end-product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear, somewhat viscous, straw-colored amber liquid so obtained may contain a small amount of sodium sulfate or sodium chloride, but in any event is perfectly acceptable for esterification in the manner described.

It is to be pointed out that the products here described are not polyesters in the sense that there is a plurality of both diol radicals and acid radicals; the product is characterized by having only one diol radical.

In some instances, and, in fact, in many instances, I have found that in spite of the dehydration methods employed above, a mere trace of water still comes through, and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the diol compound, as described in Part 1, preceding; I have added about 60 grams of benzene and then refluxed this mixture in the glass resin pot, using a phase-separating trap, until the benzene carried out all the water present as water of solution or the equivalent. Ordinarily this refluxing temperature is apt to be in the neighborhood of 130° C. to possibly 150° C. When all this water or moisture has been removed I also withdraw approximately 20 grams, or a little less, benzene and then add the required amount of the carboxy reactant and also about 150 grams of a high-boiling aromatic petroleum solvent. These solvents are sold by various oil refineries and, as far as solvent effect goes, ast as if they were almost completely aromatic in character. Typical distillation data in the particular type I have employed and found very satisfactory is the following:

| | |
|---|---|
| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 282° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added refluxing is continued and, of course, is at a high temperature, to wit, about 160° to 170° C. If the carboxy reactant is an anhydride, needless to say, no water of reaction appears; if the carboxy reactant is an acid water of reaction should appear and should be eliminated at the above reaction temperature. If it is not eliminated, I simply separate out another 10 to 20 cc. of benzene by means of the phase-separating trap and thus raise the temperature to 180° or 190° C., or even to 200° C., if need be. My preferece is not to go above 200° C.

The use of such solvent is extremely satisfactory, provided one does not attempt to remove the solvent subsequently, except by vacuum distillation, and provided there is no objection to a little residue. Actually, when these materials are used for a purpose, such as demulsification, the solvent might just as well be allowed to remain. If the solvent is to be removed by distillation, and particularly vacuum distillation, then the high boiling aromatic petroleum solvent might well be replaced by some more expensive solvent, such as decalin or analkylated decalin which has a rather definite or close range boiling point. The removal of the solvent, of course, is purely a conventional procedure and requires no elaboration.

When starting with the high molal glycol, as herein described, as one of the raw materials I have found that xylene by itself is practically or almost as satisfactory as other solvents or mixtures. Decalin also is suitable. Actually, at times there is some advantage in using a mixture of a high-boiling aromatic petroleum solvent and xylene in preparation of other typical examples of the kind herein described.

The data included in the subsequent tables, i. e., Tables 2 and 3, are self-explanatory and very complete and it is believed no further elaboration is necessary.

TABLE 2

| Ex. No. of Acid Ester | Ex. No. of Hydroxy Cmpd. | Theo. Mol. Wt. of H. C. | Theo. Hydroxyl Value of H. C. | Actual Hydroxyl Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 1,758 | 64 | 83.3 | 1,350 | 135 | Diglycolic Acid | 26.8 |
| 2b | 1a | 1,758 | 64 | 83.3 | 1,350 | 135 | Phthalic Anhyd | 29.6 |
| 3b | 1a | 1,758 | 64 | 83.3 | 1,350 | 135 | Maleic Anhyd | 19.6 |
| 4b | 1a | 1,758 | 64 | 83.3 | 1,350 | 135 | Aconitic Acid | 34.9 |
| 5b | 2a | 2,640 | 42.6 | 63.0 | 1,786 | 178.6 | Diglycolic Acid | 26.8 |
| 6b | 2a | 2,640 | 42.6 | 63.0 | 1,786 | 178.6 | Phthalic Anhyd | 29.6 |
| 7b | 2a | 2,640 | 42.6 | 63.0 | 1,786 | 178.6 | Maleic Anhyd | 19.6 |
| 8b | 2a | 2,640 | 42.6 | 63.0 | 1,786 | 178.6 | Succinic Acid | 23.6 |
| 9b | 3a | 3,878 | 29.0 | 52.8 | 2,130 | 213 | Diglycolic Acid | 26.8 |
| 10b | 3a | 3,878 | 29.0 | 52.8 | 2,130 | 213 | Phthalic Anhyd | 29.6 |
| 11b | 3a | 3,878 | 29.0 | 52.8 | 2,130 | 213 | Maleic Anhyd | 19.6 |
| 12b | 3a | 3,878 | 29.0 | 52.8 | 2,130 | 213 | Succinic Acid | 23.6 |
| 13b | 4a | 5,995 | 18.8 | 39.3 | 2,860 | 286 | Diglycolic Acid | 26.8 |
| 14b | 4a | 5,995 | 18.8 | 39.3 | 2,860 | 286 | Phthalic Anhyd | 29.6 |
| 15b | 4a | 5,995 | 18.8 | 39.3 | 2,860 | 286 | Maleic Anhyd | 19.6 |
| 16b | 4a | 5,995 | 18.8 | 39.3 | 2,860 | 286 | Citraconic Anhyd | 22.4 |
| 17b | 5a | 1,708 | 65.8 | 79.2 | 1,420 | 142 | Diglycolic Acid | 26.8 |
| 18b | 5a | 1,708 | 65.8 | 79.2 | 1,420 | 142 | Phthalic Anhyd | 29.6 |
| 19b | 5a | 1,708 | 65.8 | 79.2 | 1,420 | 142 | Maleic Anhyd | 19.6 |
| 20b | 5a | 1,708 | 65.8 | 79.2 | 1,420 | 142 | Citraconic Anhyd | 22.4 |
| 21b | 6a | 2,578 | 43.6 | 60.2 | 1,870 | 187 | Diglycolic Acid | 26.8 |
| 22b | 6a | 2,578 | 43.6 | 60.2 | 1,870 | 187 | Phthalic Anhyd | 29.6 |
| 23b | 6a | 2,578 | 43.6 | 60.2 | 1,870 | 187 | Maleic Anhyd | 19.6 |
| 24b | 6a | 2,578 | 43.6 | 60.2 | 1,870 | 187 | Succinic Acid | 23.6 |
| 25b | 7a | 3,870 | 29.0 | 52.5 | 2,140 | 214 | Diglycolic Acid | 26.8 |
| 26b | 7a | 3,870 | 29.0 | 52.5 | 2,140 | 214 | Phthalic Anhyd | 29.6 |
| 27b | 7a | 3,870 | 29.0 | 52.5 | 2,140 | 214 | Maleic Anhyd | 19.6 |
| 28b | 7a | 3,870 | 29.0 | 52.5 | 2,140 | 214 | Succinic Acid | 23.6 |
| 29b | 8a | 5,998 | 18.75 | 40.8 | 2,750 | 275 | Diglycolic Acid | 26.8 |
| 30b | 8a | 5,998 | 18.75 | 40.8 | 2,750 | 275 | Phthalic Anhyd | 29.6 |
| 31b | 8a | 5,998 | 18.75 | 40.8 | 2,750 | 275 | Maleic Anhyd | 19.6 |
| 32b | 8a | 5,998 | 18.75 | 40.8 | 2,750 | 275 | Succinic Acid | 23.6 |
| 33b | 9a | 1,700 | 66.0 | 90.5 | 1,240 | 124 | Diglycolic Acid | 26.8 |
| 34b | 9a | 1,700 | 66.0 | 90.5 | 1,240 | 124 | Maleic Anhyd | 19.6 |
| 35b | 9a | 1,700 | 66.0 | 90.5 | 1,240 | 124 | Citraconic Anhyd | 22.4 |
| 36b | 9a | 1,700 | 66.0 | 90.5 | 1,240 | 124 | Phthalic Anhyd | 29.6 |
| 37b | 10a | 2,620 | 42.8 | 69.0 | 1,630 | 163 | Diglycolic Acid | 26.8 |
| 38b | 10a | 2,620 | 42.8 | 69.0 | 1,630 | 163 | Maleic Anhyd | 19.6 |
| 39b | 10a | 2,620 | 42.8 | 69.0 | 1,630 | 163 | Citraconic Anhyd | 22.4 |
| 40b | 10a | 2,620 | 42.8 | 69.0 | 1,630 | 163 | Phthalic Anhyd | 29.6 |
| 41b | 11a | 3,940 | 28.5 | 58.8 | 1,910 | 191 | Diglycolic Acid | 26.8 |
| 42b | 11a | 3,940 | 28.5 | 58.8 | 1,910 | 191 | Oxalic Acid | 25.2 |
| 43b | 11a | 3,940 | 28.5 | 58.8 | 1,910 | 191 | Phthalic Anhyd | 29.6 |
| 44b | 11a | 3,940 | 28.5 | 58.8 | 1,910 | 191 | Maleic Anhyd | 19.6 |
| 45b | 12a | 5,270 | 21.3 | 51.0 | 2,200 | 220 | Diglycolic Acid | 26.8 |
| 46b | 12a | 5,270 | 21.3 | 51.0 | 2,200 | 220 | Oxalic Acid | 25.2 |
| 47b | 12a | 5,270 | 21.3 | 51.0 | 2,200 | 220 | Phthalic Anhyd | 29.6 |
| 48b | 12a | 5,270 | 21.3 | 51.0 | 2,200 | 220 | Maleic Anhyd | 19.6 |

TABLE 3

| Ex. No. of Acid Ester | Solvent | Amt. Solvent (grs.) | Maximum Esterification Temp., °C. | Time of Esterification (hrs.) | Water Out (cc.) |
|---|---|---|---|---|---|
| 1b | Xylene and Solvent #7 | 158 | 170-175 | 7 | 3.6 |
| 2b | do | 164 | 170-175 | 8 | |
| 3b | do | 155 | 145-150 | 5 | |
| 4b | do | 166 | 165-170 | 8 | 3.6 |
| 5b | do | 202 | 170-175 | 8 | 3.6 |
| 6b | do | 208 | 175-180 | 8 | |
| 7b | do | 298 | 150-155 | 6 | |
| 8b | do | 199 | 170-175 | 8 | 3.6 |
| 9b | do | 236 | 175-180 | 8 | 3.6 |
| 10b | do | 243 | 170-175 | 8 | |
| 11b | do | 232 | 150-155 | 6 | |
| 12b | do | 233 | 170-175 | 8 | 3.6 |
| 13b | do | 309 | 175-180 | 8 | 3.6 |
| 14b | do | 316 | 175-180 | 8 | |
| 15b | do | 306 | 150-155 | 6 | |
| 16b | do | 308 | 175-180 | 8 | |
| 17b | do | 165 | 175-180 | 8 | 3.6 |
| 18b | do | 172 | 175-180 | 8 | |
| 19b | do | 162 | 150-155 | 6 | |
| 20b | do | 164 | 175-180 | 8 | |
| 21b | do | 210 | 175-180 | 8 | 3.6 |
| 22b | do | 217 | 175-180 | 7 | |
| 23b | do | 207 | 145-150 | 5 | |
| 24b | do | 207 | 175-180 | 8 | 3.6 |
| 25b | do | 237 | 170-175 | 8 | 3.6 |
| 26b | do | 244 | 175-180 | 8 | |
| 27b | do | 234 | 150-155 | 5 | |
| 28b | do | 234 | 160-165 | 10 | 3.6 |
| 29b | do | 298 | 160-165 | 8 | 3.6 |
| 30b | do | 305 | 160-165 | 8 | |
| 31b | do | 295 | 145-150 | 5 | |
| 32b | do | 295 | 165-170 | 8 | 3.6 |
| 33b | do | 147 | 175-180 | 6 | 3.6 |
| 34b | do | 144 | 150-155 | 6 | |
| 35b | do | 146.5 | 170-175 | 6 | |
| 36b | do | 153.5 | 170-175 | 6 | 3.6 |
| 37b | do | 186 | 175-180 | 6 | 3.6 |
| 38b | do | 183 | 150-155 | 6 | |
| 39b | do | 185.5 | 175-180 | 6 | |
| 40b | do | 193 | 175-180 | 6 | 3.6 |
| 41b | do | 214 | 170-175 | 7 | 3.6 |
| 42b | do | 209 | 175-180 | 8 | 7.2 |
| 43b | do | 221 | 170-175 | 7 | |
| 44b | do | 211 | 150-155 | 6 | |
| 45b | do | 243 | 175-180 | 6 | 3.6 |
| 46b | do | 238 | 175-180 | 6 | 7.2 |
| 47b | do | 250 | 175-180 | 6 | |
| 48b | do | 240 | 150-155 | 6 | |

The procedure for manufacturing the esters has been illustrated by preceding examples. If for any reason reaction does not take place in a manner that is acceptable, attention should be directed to the following details:

(a) Recheck the hydroxyl or acetyl value of the oxypropylated high molal glycol as in Part 1, preceding;

(b) If the reaction does not proceed with reasonable speed, either raise the temperature indicated or else extend the period of time up to 12 or 16 hours if need be;

(c) If necessary, use ½% of paratoluene sulfonic acid, or some other acid, as a catalyst; and (d) If the esterification does not produce a clear product, a check should be made to see if an inorganic salt such as sodium chloride or sodium sulfate is not precipitating out. Such salt should be eliminated, at least for exploration experimentation, and can be removed by filtering.

Everything else being equal, as the size of the molecule increases and the reactive hydroxyl radical represents a smaller fraction of the entire molecule, more difficulty is involved in obtaining complete esterification.

Even under the most carefully controlled conditions of oxypropylation involving comparatively low temperatures and long time of reaction, there are formed certain compounds whose compositions are still obscure. Such side reaction products can contribute a substantial portion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant, for the reason that apparently under conditions of reaction less reactive hydroxyl radicals are present than indicated by the hydroxyl value. Under such circumstances there is simply a residue of the carboxylic reactant which can be removed by filtration, or, if desired, the esterification procedure can be repeated, using an appropriately reduced ratio of carboxylic reactant.

Even the determination of the hydroxyl value and conventional procedure leaves much to be desired, due either to the cogeneric materials previously referred to, or, for that matter, the presence of any inorganic salts or propylene oxide. Obviously this oxide should be eliminated.

The solvent employed, if any, can be removed from the finished ester by distillation, and particularly vacuum distillation. The final products or liquids are generally from almost black or reddish-black to dark amber in color, and show moderate viscosity. They can be bleached with bleaching clays, filtering chars, and the like. However, for the purpose of demulsification or the like, color is not a factor and decolorization is not justified.

In the above instances I have permitted the solvents to remain present in the final reaction mass. In other instances I have followed the same procedure, using decalin or a mixture of decalin or benzene in the same manner and ultimately removed all the solvents by vacuum distillation.

PART 3

In the hereto appended claims the demulsifying agent is described as an ester obtained from a polyhydroxylated material prepared from the described diols. If one were concerned with a monohydroxylated material or a dihydroxylated material one might be able to write a formula which in essence would represent the particular product. However, in a more highly hydroxylated material the problem becomes increasingly more difficult for reasons which have already been indicated in connection with oxypropylation and which can be examined by merely considering for the moment a monohydroxylated material.

Oxyalkylation, particularly in any procedure which involves the introduction of repetitious ether linkages, i. e., excessive oxyalkylation, using, for example, ethylene oxide, propylene oxide, etc., runs into difficulties of at least two kinds; (a) formation of a cogeneric mixture rather than a single compound, and (b) excessive side reactions or the like. The former phase will be considered in the paragraphs following. As to the latter phase, see U. S. Patent No. 2,236,919, dated April 1, 1941, to Reynhart.

Oxypropylation involves the same sort of variations as appear in preparing high molal polypropylene glycols. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol group, etherization being involved, of course, in each instance.

Usually no effort is made to differentiate between oxypropylation taking place, for example, at the primary alcohol radical or the secondary alcohol radical. Actually, when such products are obtained, such as a high molal propylene glycol or the products obtained in the manner herein described one does not obtain a single derivative such as HO(RO)$_n$H or —(RO)$_n$H in which $n$ has one and only one value, for instance, 14, 15 or 16, or the like. Rather, one obtains a cogeneric mixture of closely related or touching homologues. These materials invariably have high molecular weights, and cannot be separated from one another by any known procedure, without decomposition. The proportion of such mixture represents the contribution of the various individual members of the mixture. On a statistical basis, of course, $n$ can be appropriately specified.

It becomes obvious that when carboxylic acidic esters are prepared from such high molal molecular weight materials that the ultimate esterification product must, in turn, be a cogeneric mixture. Likewise, it is obvious that the contribution to the total molecular weight made by the polycarboxy reactant is small. Thus, one might expect that the effectiveness of the demulsifier in the form of the acidic fractional ester would be comparable to the esterified hydroxylated material. Remarkably enough, in practically every instance the product is distinctly better, and in the majority of instances much more effective.

PART 4

As pointed out previously, the final product obtained is a fractional ester having free carboxyl radicals. Such product can be used as an intermediate for conversion into other derivatives which are effective for various purposes, such as the breaking of petroleum emulsions of the kind herein described. For instance, such product can be neutralized with an amine so as to increase its water-solubility such as triethanolamine, tripropanolamine, oxyethylated triethanolamine, etc. Similarly, such product can be neutralized with some amine which tends to reduce the water-solubility such as cyclohexylamine, benzylamine, decylamine, tetradecylamine, octadecylamine, etc. Furthermore, the residual carboxyl radicals can be esterified with alcohols, such as low molal alcohols, methyl, ethyl, propyl, butyl, etc., and also high molal alcohols, such as octyl, decyl, cyclohexanol, benzyl alcohol, octadecyl alcohol, etc. Such products are also valuable for a variety of purposes due to their modified solubility. This is particularly true where surface-active materials are of value and especially in demulsification of water-in-oil emulsions.

Having thus described my invention, what I claim as new and desire to secure by Letters Patent, is:

1. Synthetic hydrophile products selected from the class consisting of (A) synthetic hydrophile products being characterized by the following formula

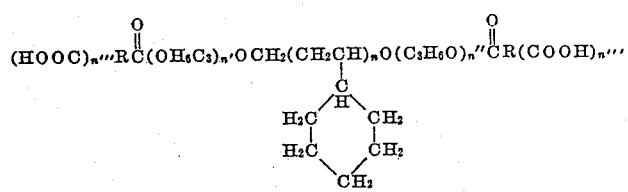

in which $n$ is an integer from 2 to 5, $n'$ and $n''$ represent whole numbers which when added together equal a sum varying from 15 to 80, $n'''$ is a whole number not over 2, and R is the radical of a polycarboxy acid selected from the class consisting of acyclic and isocyclic polycarboxy acids having not more than 8 carbon atoms and composed of carbon, hydrogen and oxygen of the formula:

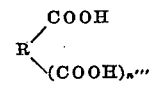

in which $n''$ has its prior significance; and with the final proviso that the parent dihydroxylated compound prior to esterification be water-insoluble; and (B) synthetic hydrophile products characterized by the following formula

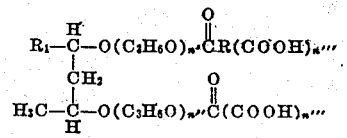

in which $n'$ and $n''$ represent whole numbers which when added together equal a sum varying from 15 to 80, $n'''$ is a whole number not over 2, $R_1$ is a dialkyl cyclohexyl radical and R is the radical of a polycarboxy acid selected from the class consisting of acyclic and isocyclic polycarboxy acids having not more than 8 carbon atoms and composed of carbon, hydrogen and oxygen of the formula:

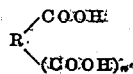

in which $n'''$ has its prior significance; and with the final proviso that the parent dihydroxylated compound prior to esterification be water-insoluble.

2. Synthetic hydrophile products; said synthetic hydrophile products being characterized by the following formula:

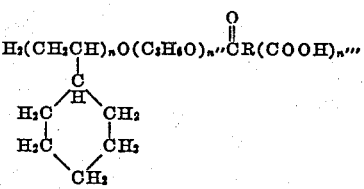

in which $n$ is an integer from 2 to 5, $n'$ and $n''$ represent whole numbers which when added together equal a sum varying from 15 to 80, $n'''$ is a whole number not over 2, and R is the radical of a polycarboxy acid selected from the class consisting of acyclic and isocyclic polycarboxy acids having not more than 8 carbon atoms and composed of carbon, hydrogen and oxygen of the formula:

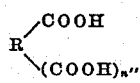

in which $n'''$ has its prior significance; and with the final proviso that the parent dihydroxylated compound prior to esterification be water-insoluble.

3. Synthetic hydrophile products; said synthetic hydrophile products being characterized by the following formula

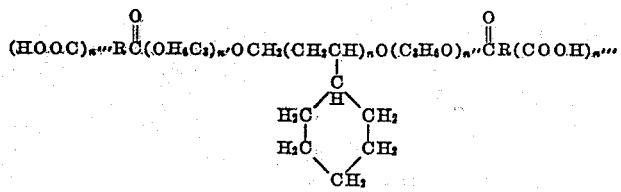

in which $n$ is an integer from 2 to 5, $n''$ and $n''$ represent whole numbers which when added together equal a sum varying from 15 to 80, $n'''$ is a whole number not over 2, and R is the radical of a polycarboxy acid selected from the class consisting of acyclic and isocyclic polycarboxy acids having not more than 8 carbon atoms and composed of carbon, hydrogen and oxygen of the formula:

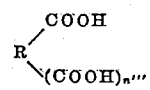

in which $n'''$ has its prior significance; and with the final proviso that the parent dihydroxylated compound prior to esterification be water-insoluble and xylene-soluble.

4. Synthetic hydrophile products; said synthetic hydrophile products being characterized by the following formula:

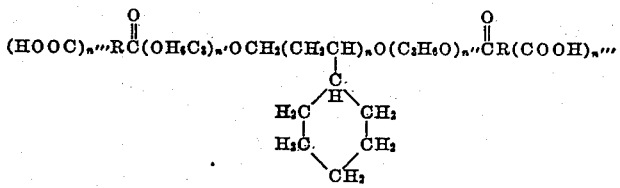

in which $n$ is an integer from 2 to 5, $n'$ and $n''$ represent whole numbers which when added together equal a sum varying from 15 to 80, $n'''$ is a whole number not over 2, and R is the radical of a polycarboxy acid selected from the class consisting of acyclic and isocyclic polycarboxy acids having not more than 8 carbon atoms and composed of carbon, hydrogen and oxygen of the formula:

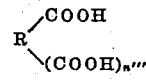

in which $n'''$ has its prior significance; and with the final proviso that the parent dihydroxylated compound prior to esterification be water-insoluble and both kerosene- and xylene-soluble.

5. Synthetic hydrophile products; said synthetic hydrophile products being characterized by the following formula

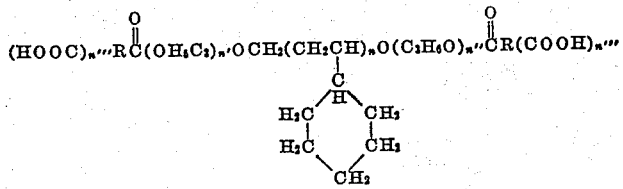

in which $n$ is an integer from 2 to 5, $n'$ and $n''$ represent whole numbers which when added together equal a sum varying from 15 to 80, $n'''$ is a whole number not over 2, and R is the radical of a polycarboxy acid selected from the class consisting of acyclic and isocyclic polycarboxy acids having not more than 8 carbon atoms and composed of carbon, hydrogen and oxygen of the formula:

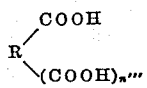

in which $n'''$ has its prior significance; and with the final proviso that the parent dihydroxylated compound prior to esterification be water-insoluble, and both kerosene- and xylene-soluble.

6. Synthetic hydrophile products; said synthetic hydrophile products being characterized by the following formula

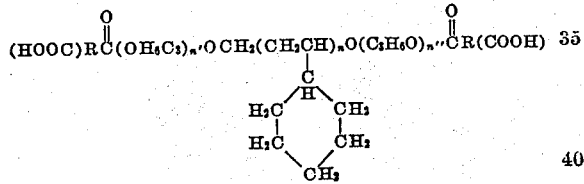

in which $n$ is an integer from 2 to 5, $n'$ and $n''$ represent whole numbers which when added together equal a sum varying from 15 to 80, and R is the radical of a dicarboxy acid selected from the class consisting of acyclic and isocyclic dicarboxy acids having not more than 8 carbon atoms and composed of carbon, hydrogen and oxygen of the formula:

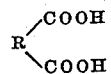

and with the final proviso that the parent dihydroxylated compound prior to esterification be water-insoluble, and both kerosene- and xylene-soluble.

7. The product of claim 6 wherein the dicarboxy acid is phthalic acid.

8. The product of claim 6 wherein the dicarboxy acid is maleic acid.

9. The product of claim 6 wherein the dicarboxy acid is succinic acid.

10. The product of claim 6 wherein the dicarboxy acid is citraconic acid.

11. The product of claim 6 wherein the dicarboxy acid is diglycollic acid.

References Cited in the file of this patent

UNITED STATES PATENTS

| Number | Name | Date |
| --- | --- | --- |
| 2,453,634 | Marple | Nov. 9, 1948 |
| 2,562,878 | Blair | Aug. 7, 1951 |